United States Patent [19]

Blaisdell et al.

[11] Patent Number: 4,647,809
[45] Date of Patent: Mar. 3, 1987

[54] ELECTRIC LAMP WITH SELF-MOUNTING FRAME-ASSEMBLY AND METHOD OF CONSTRUCTING SAME

[75] Inventors: Ronald G. Blaisdell, Saugus; Peter R. Gagnon, Georgetown, both of Mass.

[73] Assignee: GTE Products Corporation, Stamford, Conn.

[21] Appl. No.: 792,620

[22] Filed: Oct. 24, 1985

Related U.S. Application Data

[63] Continuation of Ser. No. 469,841, Feb. 25, 1983, abandoned.

[51] Int. Cl.⁴ .......................... H01J 7/24; H01J 9/34; H01K 1/46
[52] U.S. Cl. .................................. 313/25; 313/318; 445/27
[58] Field of Search .................. 313/17, 25, 26, 578, 313/580, 579, 318; 445/22, 26, 27; 339/221 L, 91 L, 97 L, 119 L, 176 L; 362/267

[56] References Cited

U.S. PATENT DOCUMENTS

| 3,194,625 | 7/1965 | Danko | 313/26 |
| 3,417,367 | 12/1968 | Dayton et al. | 313/580 X |
| 3,671,923 | 6/1972 | Rieth | 339/176 L |
| 4,295,076 | 10/1981 | Eckhardt et al. | 313/580 |
| 4,385,257 | 5/1983 | Fitzgerald | 362/267 |

*Primary Examiner*—Palmer C. DeMeo
*Assistant Examiner*—Sandra L. O'Shea
*Attorney, Agent, or Firm*—Joseph S. Romanow; William H. McNeill

[57] ABSTRACT

A double-enveloped electric lamp having a self-mounting frame-assembly for supporting a light-source capsule within the outer envelope, such frame-assembly being mounted by means of elastic and frictional forces other than glass-to-glass or glass-to-metal seals. In one embodiment of the invention, the frame-assembly is mounted on the neck of the outer envelope by means of a clamp on each leg of the frame-assembly; each clamp grasps the brim of the neck within a formed groove. Locking means may be obtained by mounting the lamp base over the grooves; barbed prongs on each clamp bite into the shell of the base and lock together the component parts of the lamp. In a second embodiment, a wire frame-assembly having two preformed legs with barbed prongs is mounted on the neck of the outer envelope by fitting each preformed leg into a matching groove formed in the threaded neck of the outer envelope. Locking means may be obtained when the lamp base is screwed over these grooves; the barbed prongs bite into the shell of the base and lock together the component parts of the lamp. Double-enveloped lamps having self-mounting frame-assemblies may be constructed more simply and economically than possible under the existing art.

10 Claims, 11 Drawing Figures

ELECTRIC LAMP WITH SELF-MOUNTING FRAME-ASSEMBLY AND METHOD OF CONSTRUCTING SAME

CROSS REFERENCES TO RELATED APPLICATIONS

This application is a continuation of application Ser. No. 469,841, now abandoned, filed Feb. 25, 1983, assigned to the same assignee as the parent application.

U.S. Ser. No. 862,161, filed May 12, 1986, being a continuation of U.S. Ser. No. 469,844, filed Feb. 25, 1983, now abandoned, and U.S. Ser. No. 835,409, filed Mar. 3, 1986, being a continuation of U.S. Ser. No. 469,843, filed Feb. 25, 1983, all of which are assigned to the assignee hereof and contain related subject matter.

TECHNICAL FIELD

This invention relates to electric lamps and more particularly to such lamps having a self-mounting frame-assembly for supporting a light-source capsule within an outer envelope.

BACKGROUND ART

Under the existing art, the manufacture of a double-enveloped electric lamp typically involves the following steps. A light-source capsule having two lead-in wires is mounted on a glass stem support. The capsule and stem are inserted into the outer envelope. The glass stem support is flame sealed to the glass outer envelope. The outer envelope is evacuated, a desired fill gas may be introduced into the outer envelope, and the outer envelope is hermetically sealed. A lamp base is mounted on and cemented to the neck of the outer envelope. One of the capsule lead-in wires is soldered to the insulated tip of the base. The second lead-in wire is soldered or welded to the outer shell of the base.

The described manufacturing process is relatively costly. The fabrication of a hermetic seal between the lead-in wires and glass stem and between the stem and outer envelope requires considerable technological skill and quality control.

A double-enveloped electric lamp, of equivalent or improved quality compared with those currently available, which can be manufactured by a process simpler and less expensive than the process hereinbefore described would constitute an advancement in the art.

DISCLOSURE OF THE INVENTION

It is, therefore, an object of this invention to obviate the deficiencies in the prior art.

It is another object of this invention to provide a self-mounting frame-assembly for a double-enveloped electric lamp.

It is still another object of this invention to provide a double-enveloped electric lamp which can be manufactured simply and economically.

These objects are accomplished, in one aspect of the invention, by the provision of an electric lamp comprising an outer envelope, a frame-assembly within the outer envelope, and a light-source capsule mounted on one end of the frame-assembly. The lamp further comprises mounting means operatively mounting the frame-assembly and light-source capsule within the outer envelope by means of elastic and frictional forces. Means are operatively connected to the lamp for providing electrical power to the light-source capsule.

The lamp is manufactured by a method comprising the following steps. An outer envelope is formed. A frame-assembly is formed. A light-source capsule is constructed. The light-source capsule is mounted on one end of the frame-assembly. The frame-assembly and light-source capsule are mounted within the outer envelope by means of elastic and frictional forces. Means for providing electrical power to said light-source capsule from an external source are operatively connected to the lamp.

Double-enveloped electric lamps having a self-mounting frame-assembly for supporting a light-source capsule within the outer envelope may be manufactured more simply and economically than double-enveloped lamps currently available without any sacrifice in the quality of the lamps.

BEST MODE FOR CARRYING OUT THE INVENTION

For a better understanding of the present invention, together with other and further objects, advantages, and capabilites thereof, reference is made to the following disclosure and appended claims taken in conjunction with the above-described drawings.

As used herein, the term "light-source capsule" denotes a halogen capsule of a tungsten halogen incandescent lamp; an arc tube of an arc discharge lamp; or any light-emitting capsule within the outer envelope of a lamp.

The term "elastic" herein is defined as the property of a body, when deformed, to return to its normal configuration automatically as the deforming forces are removed. The term "friction" herein is defined to be the force which opposes relative motion between two touching bodies caused by the respective properties of the surfaces of each body which are in contact with each other. Neither "elastic" nor "friction" as used herein shall include any force which opposes relative motion between two bodies caused by the fusion of one body with the other, such fusion including any glass-to-glass or glass-to-metal seal.

Figure 1:
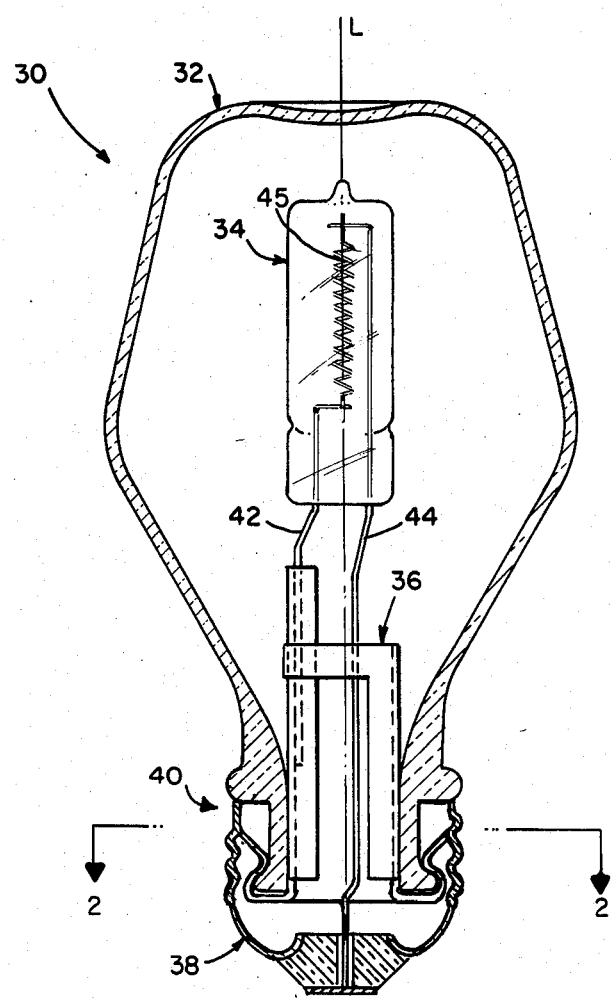
FIG. 1 is a sectional view of one embodiment of the invention.

Referring to the drawings with greater particularity, FIG. 1 shows one embodiment of the invention, being lamp 30 having a longitudinal axis L and comprising outer-envelope 32, light-source capsule 34, frame-assembly 36, and base 38. Outer-envelope 32 has a neck-portion 40. Capsule 34 in this instance is a tungsten halogen incandescent capsule with a first lead-in wire 42, a second lead-in wire 44, and a tungsten filament 45 extending between the internal terminantions of lead-in wires 42 and 44. Capsule 34 in this embodiment is mounted on frame 36 by means of lead-in wire 42.

Figure 2:
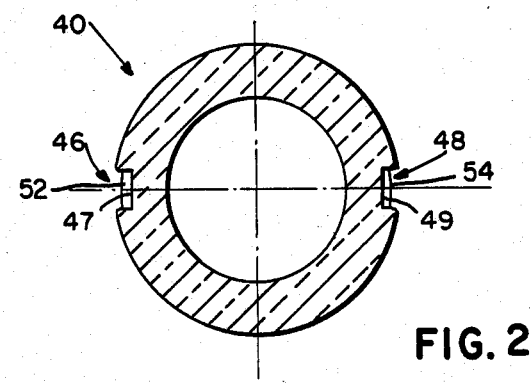
FIG. 2 is an enlarged sectional plan view along line 2—2 of FIG. 1 with parts removed for clarity.

FIG. 2 shows neck 40 having first groove 46 with inner-wall 47, and second groove 48 with inner-wall 49, both grooves being formed in neck 40.

Figure 3:
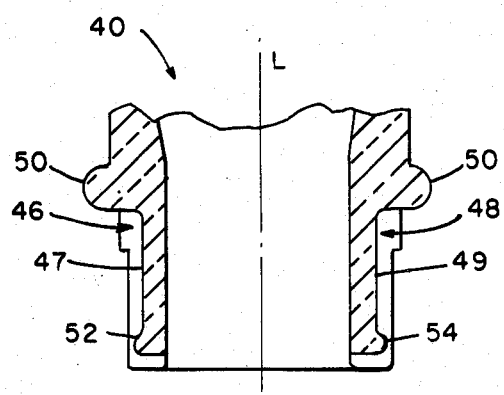
FIG. 3 is an enlarged sectional view of the neck-portion of the outer envelope of the embodiment of the invention shown in FIG. 1.

FIG. 3 shows that within groove 46, ridge 52 is formed adjacent to the brim of neck 40; likewise, ridge 54 is formed adjacent to the brim of neck 40 within groove 48. Annular ridge 50 circumscribes neck 40 adjacent to the ends of grooves 46 and 48 remote from the brim; ridge 50 is not confined within grooves 46 and 48.

Figure 4:
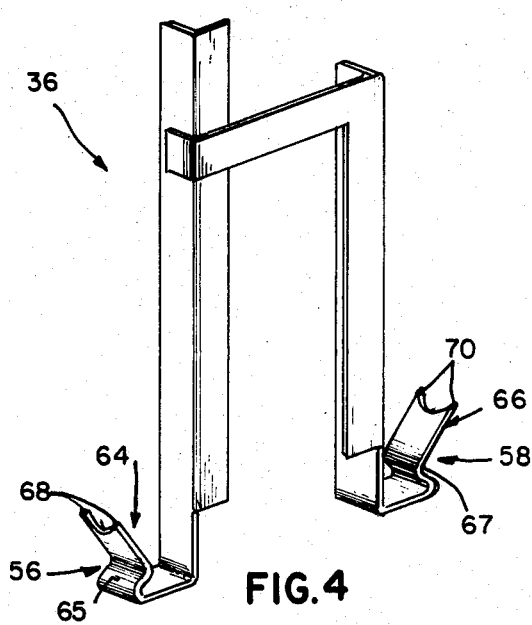
FIG. 4 is an enlarged pictorial view of a frame-assembly employed in the embodiment of the invention shown in FIG. 1.

Frame assembly 36 is illustrated in FIG. 4 and is characterized herein as being the "clamp-on" type. This characterization describes the manner in which frame-assembly 36 is mounted as will be described below. As may be seen in FIG. 1, frame 36, with capsule 34 mounted thereon, is inserted into outer envelope 32 through neck 40 and positioned such that clamps 56 and 58 are aligned with grooves 46 and 48, respectively. Frame 36 may be pushed deeper into outer envelope 32. In so doing, clamp 56 will be spread open by ridge 52. When frame 36 has been fully inserted into outer envelope 32, clamp 56 will spring back to its original shape because of the inherent elasticity of the material from which clamp 56 is constructed. Clamp 56 may be characterized as "clamping on" to ridge 52. When frame 36 is mounted, re-entrant portion 65 of clamp 56 clasps ridge 52. In an identical manner, re-entrant portion 67 of clamp 58 clasps ridge 54. Thus, clamps 56 and 58, through their re-entrant portions 65 and 67, exert elastic and frictional forces against neck 40 of outer envelope 32 which comprise the mounting means for frame 36 in this embodiment of the invention.

Figure 5:
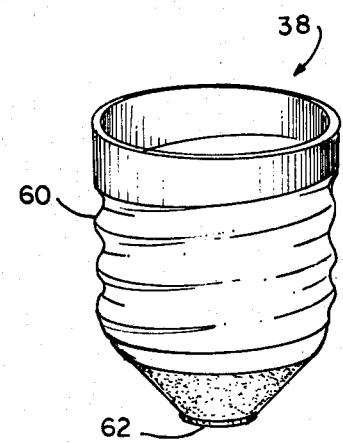
FIG. 5 is a pictorial view of a threaded lamp base.

FIG. 5 is a pictorial view of a lamp base 38 comprising threaded shell 60 and insulated tip 62. In the embodiment of the invention shown in FIG. 1, base 38 is characterized as a "push-on" type. This characterization describes the method of mounting base 38 on outer envelope 32, which is accomplished by pushing base 38 over neck 40 and clamps 56 and 58 toward ridge 50. In so mounting base 38, shell 60 will compress prongs 64 and 66 toward inner walls 47 and 49, respectively, thereby preventing clamps 56 and 58 from opening, as well as insuring that clamps 56 and 58 will be tightly and securely mounted on outer envelope 32. Base 38, when mounted, reinforces the mounting means for frame 36.

Prongs 64 and 66 have sharply barbed tips 68 and 70, respectively. When base 38 has been fully mounted, tips 68 and 70 will bite into shell 60. Base 38, when mounted, will deform prongs 64 and 66 into grooves 46 and 48, respectively. Elastic forces within these clamps will tend to return prongs 64 and 66 to their unextended positions. The elastic forces cause tips 68 and 70 of prongs 64 and 66, respectively, to press against shell 60 with sufficient force to imbed the sharply pointed barbs into shell 60. Any attempted motion of base 38 away from ridge 50 or any attempted rotation of base 38, clockwise or counter-clockwise, about neck 40 will be prevented by prongs 64 and 66 which, being imbedded in shell 60, will hold or "lock" base 38 securely in its mounted position. Thus, in this embodiment of the invention, base 38 cooperates with clamps 56 and 58 and neck 40 in order to form locking means whereby frame 36, base 38, and outer envelope 32 will remain securely engaged despite jostling and use of lamp 30.

Figure 6:
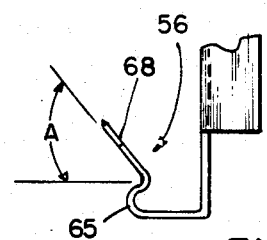
FIG. 6 is an enlarged elevational view of one clamp portion of the frame-assembly shown in FIG. 4.

FIG. 6 is an enlarged elevational view of clamp 56 showing angle A, which preferably is greater than 45°. When base 38 is being mounted, shell 60 depresses prong 64 into groove 46. Because of the freedom of motion into groove 46, clamp 56 does not resist the movement of base 38 over neck 40 toward ridge 50. For identical reasons, clamp 58 does not resist the same movement of base 38. When base 38 is fully mounted, any movement of base 38 away from ridge 50 or any rotational movement of base 38 will be prevented by clamps 56 and 58.

In this embodiment of the invention, base 38 is threaded. The thread on shell 60 is not essential to the locking means. A bayonet type base or another type of lamp base with or without thread may be employed with the same locking means as described with this embodiment and the desired results will be obtained. Barbed tips 68 and 70 are fabricated from a material sufficiently sharp and durable with respect to shell 60 that tips 68 and 70 will "bite" or imbed themselves into shell 60 when base 38 is mounted on neck 40.

The contact of tips 68 and 70 with shell 60 can form a suitable electrical connection between shell 60 and frame 36. In this embodiment, frame 36 is constructed from an electrically conducting material and lead-in 42 may be mounted on frame 36 such that a suitable electrical connection, as well as an adequate structural connection, is made between lead-in 42 and frame 36. Thus, lead-in 42 of capsule 34 is electrically connected, via frame 36 and shell 60, to one pole of an external power supply; the elastic nature of frame 36 will assist in maintaining the electrical contact throughout the life of the lamp. The electrical circuit within lamp 30 is completed by electrically connecting lead-in 44 of capsule 34 to tip 62 of base 38, such as by soldering; tip 62 being electrically insulated from shell 60 of base 38. Shell 60 and tip 62 of base 38 are constructed from an electrically conducting material.

Figure 7:
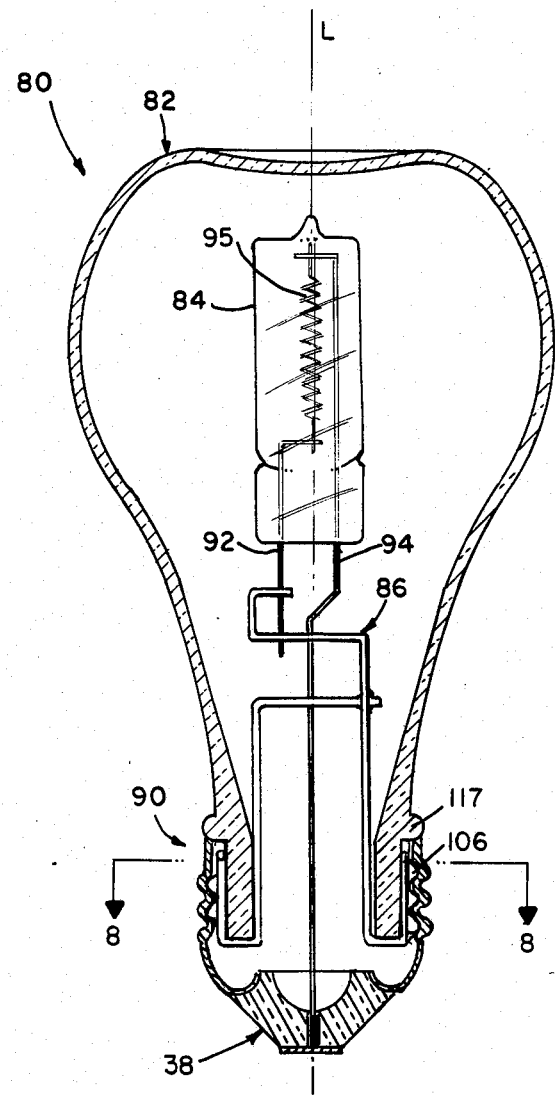
FIG. 7 is a sectional view of another embodiment of the invention.
Figure 8:
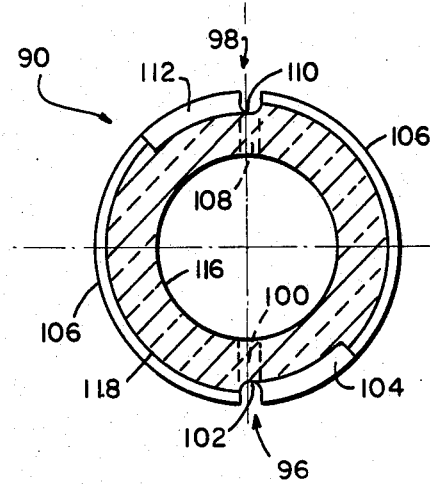
FIG. 8 is an enlarged sectional plan view along line 8—8 of FIG. 7, with parts removed for clarity.
Figure 9:
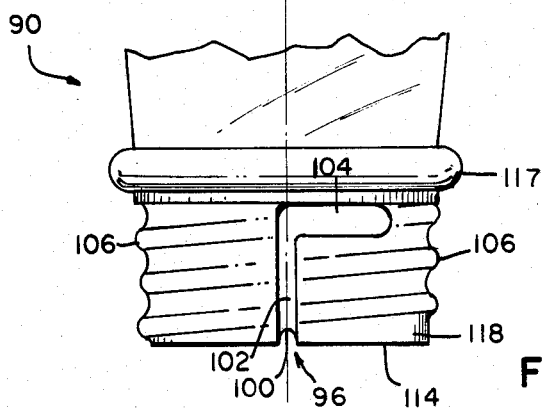
FIG. 9 is an enlarged elevational view of the neck-portion of the outer envelope of the embodiment of the invention shown in FIG. 7.

FIG. 7 shows another embodiment of the invention. Lamp 80 has a longitudinal axis L and comprises outer envelope 82, light-source capsule 84, frame-assembly 86, and threaded base 38. Outer envelope 82 has a neck-portion 90. In this instance, capsule 84 is a tungsten-halogen incandescent capsule with a first lead-in wire 92, a second lead-in wire 94, and a tungsten filament 95 extending between the internal terminations of lead-in wires 92 and 94. Capsule 84 is mounted on frame 86 by means of lead-in wire 92.

Neck 90 is formed with a first-groove 96 and second-groove 98. Groove 96 comprises three connecting grooves, namely first-connecting groove 100, second-connecting groove 102, and third-connecting groove 104. Groove 100 is formed in brim 114 of neck 90 and runs from the inside surface 116 to outside surface 118 where it connects with groove 102.

Neck 90 has thread 106 formed therein; the thread extends approximately from brim 114 to ridge 117. Thread 106 is matched with the inside thread of base 38 such that base 38 may be mounted by being screwed onto neck 90. Groove 102 is formed into outside surface 118 and thread 106. Groove 102 proceeds from brim 114 toward ridge 117 running parallel to central axis L and traversing thread 106 until groove 102 meets groove 104. Groove 104 is formed in outside surface 118 and thread 106; it is perpendicular to groove 102; it proceeds from groove 102 in the direction that thread 106 advances toward ridge 117.

Groove 98, comprising connecting grooves 108, 110, and 112, is formed opposite groove 96 in neck 90. Grooves 104 and 112 both point in the direction of advancing thread 106, i.e., in the direction of rotation of base 38 when base 38 is being mounted on neck 90.

Figure 10:
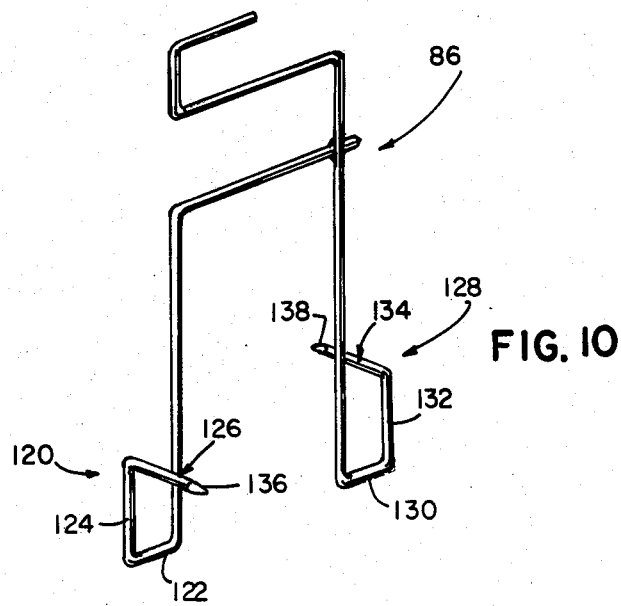
FIG. 10 is a pictorial view of a frame-assembly employed in the embodiment of the invention shown in FIG. 7.

FIG. 10 is a pictorial view of frame-assembly 86 which is characterized herein as being the "slide-on" type. This characterization describes the manner in which frame-assembly 86 is mounted. As may be seen in FIG. 7, frame 86, with capsule 84 mounted thereon, is inserted into outer envelope 82 through neck 90 and positioned such that formed-leg 120 is aligned with groove 96 and formed-leg 128 is aligned with groove 98. This is possible because leg 120 of frame 86 has been preformed to match groove 96 of neck 90 as follows: segment 122 fits into groove 100; segment 124 fits into groove 102; segment 126 fits into groove 104 at the intersection of groove 102 and 104; and segment 126 protrudes tangentially from groove 104. In a similar manner, leg 128 of frame 86 has been preformed to match groove 98 of neck 90 such that segment 130 fits into groove 108; segment 132 fits into groove 110; segment 134 fits into groove 112 at the intersection of grooves 110 and 112; and segment 134 protrudes tangentially from groove 112.

Figure 11:
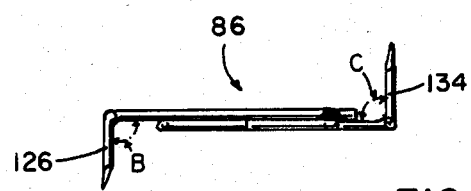
FIG. 11 is a top view of the frame-assembly used in the embodiment of the invention shown in FIG. 7.

FIG. 11 is a top view of frame-assembly 86 showing angles B and C, each a right angle, which explains why segments 126 and 134 protrude tangentially from grooves 104 and 112, respectively, when frame 86 is mounted on neck 90. Thus, frame 86 is mounted on outer envelope 82 by "sliding on" frame 86 to neck 90 such that legs 120 and 128 fit into matched receiving grooves 96 and 98, respectively.

The threaded lamp base 38 also may be used with the lamp shown in FIG. 7. Base 38 is mounted on neck 90 by screwing base 38 onto thread 106 with frame 86 already fitted onto neck 90. In order to mount base 38 fully, protruding segments 126 and 134 of frame 86 must be depressed into grooves 104 and 112, respectively. Base 38 is characterized as a "screw-on" base because of the method of mounting. While depressed, segments 126 and 134 act as springs; each segment exerts an elastic force against shell 60 of base 38. These elastic forces do not impede the forward rotation of base 38 toward ridge 117 of neck 90, because both segments point in the direction of the mounting rotation. However, if base 38 is rotated in the direction of dismounting, barbed tips 136 and 138 of legs 120 and 128, respectively, will immediately bite into shell 60 and prevent further rotation of base 38 in the dismount direction. Thus, once base 38 is fully mounted, base 38 is "locked" permanently in place.

The mounting of base 38 also securely fixes frame 86. Base 38 depresses segments 126 and 134 tightly into grooves 104 and 112, respectively, and the spring action of both of these segments against shell 60 reinforces the security of the mounting means for frame 86. The entire shell of base 38 also assists in the mounting means for frame 86.

In the embodiment shown in FIG. 7, the matched thread of neck 90 and base 38 permits base 38 to be mounted by means of being screwed on neck 90. Barbed tips 136 and 138 can be formed from a sufficently sharp and durable material with respect to shell 60 to insure that the tips will bite into or become imbedded into shell 60 whereby the locking means will be implemented.

In the embodiment shown in FIG. 7, frame 86 is constructed from an electrically conducting material. The contact of tips 136 and 138 with shell 60 forms a redundant electrical contact for one pole of an electrical circuit. Electrical power from an external source may be transmitted to capsule 84 through frame 86 which is electrically connected to lead-in wire 92. The circuit is completed by electrically connecting lead-in wire 94 to tip 62 of base 38 which is electrically insulated from shell 60.

In a laboratory example of the embodiment of FIG. 1, .020 inch (.051 centimeters) thick nickel-plated stainless steel was used for the fabrication of frame-assembly 36. Capsule 34 was mounted on frame 36 by welding lead-in 42 to frame 36.

In a laboratory example of the embodiment of FIG. 7, frame 86 was constructed from 0.050 inch (1.27 centimeters) diameter nickle-plated steel wire. Capsule 84 was mounted to frame 86 by welding lead-in 92 to frame 86. In both embodiments, base 38 was an Edison base. The frame assemblies were constructed by welding the respective component parts.

In laboratory examples of both embodiments of the invention disclosed in FIG. 1 and FIG. 7, the wall thickness of the neck-portion of the outer envelope was greater than any of the other walls of the outer envelope in order to provide additional strength to the neck-portion of the lamps. The outer-envelopes were formed from soda-lime glass via a blow-molding manufacturing process.

While there have been shown what are at present considered to be preferred embodiments of the invention, it will be apparent to those skilled in the art that various changes and modifications can be made herein without departing from the scope of the invention as defined by the appended claims.

We claim:
1. A double-enveloped electric lamp comprising:
   (a) an outer envelope formed from light-transmissive material, said outer envelope including a neck having mounting means formed therein;
   (b) an inner envelope being a light-source capsule, said light-source capsule having two lead-in wires protruding therefrom;
   (c) a frame assembly for mounting said light-source capsule within said outer envelope, said frame-assembly being formed from stiff electrically conductive material, said frame-assembly having first and second ends, one of said lead-in wires of said light-source capsule being mounted on and electrically connected to said first end, said second end being shaped so as to engage said mounting means of said neck by means of elastic and frictional forces; and
   (d) a base mounted on said neck, said base being engaged with said second end of said frame-assembly such that said frame-assembly is securely mounted on said mounting means of said neck by means of elastic and frictional forces, said base including two electrical poles insulated from each other, said second end of said frame assembly being in electrical contact with one of said poles, said other lead-in wire being electrically isolated from said frame- assembly and electrically connected to the other of said poles of said base.

2. A lamp as described in claim 1 wherein said mounting means of said neck includes two grooves, said second end of said frame-assembly includes two legs, and each of said legs is shaped to fit within one of said grooves, respectively.

3. A lamp as described in claim 1 wherein said second end of said frame-assembly includes at least one sharply pointed barb such that after said base has been mounted said barb will be imbedded into said base whereby said base will be securely held in its mounted position.

4. A lamp as described in claim 1 wherein said neck includes thread formed therein and wherein said base is formed so as to include matching thread whereby said base may be mounted by screwing said base onto said neck.

5. A lamp as described in claim 1 wherein said inner envelope is a tungsten-halogen light-source capsule.

6. A method of constructing a double-enveloped electric lamp comprising the steps of:
  (a) forming an outer envelope from light-transmissive material, said outer envelope including a neck having mounting means formed therein;
  (b) forming an inner envelope, said inner envelope being a light-source capsule having two lead-in wires protruding therefrom;
  (c) forming a frame-assembly from stiff electrically conductive material, said frame-assembly having first and second ends;
  (d) forming a base, said base including two electrical poles insulated from each other;
  (e) mounting one of said lead-in wires of said light-source capsule on said first end of said frame-assembly such that there is an electrical connection between said mounted lead-in wire and said frame-assembly;
  (f) engaging said second end of said frame-assembly with said mounting means of said neck by means of elastic and frictional forces such that said light-source capsule and said first end of said frame assembly are positioned within said outer envelope;
  (g) mounting said base onto said neck such that said base mechanically and electrically engages said second end of said frame-assembly whereby said second end of said frame-assembly is securely mounted on said mounting means of said neck by means of elastic and frictional forces and an electrical connection has been made between one of said electical poles of said base and said second end of said frame assembly; and
  (h) isolating said second lead-in wire of said light-source capsule from said frame-assembly and electrically connecting said second lead-in wire to the other of said electrical poles of said base.

7. A method of constructing a double-enveloped electric lamp as described in claim 6 wherein in step (a) forming said mounting means includes forming two grooves in said mounting means; wherein in step (c) forming said second end of said frame-assembly includes forming two shaped legs of said second end, each of said legs being shaped to fit within one of said grooves, respectively; and wherein in step (f) engaging said second end of said frame-assembly with said mounting means includes inserting each of said shaped legs into the respective matching groove of said mounting means.

8. A method of constructing a double-enveloped electric lamp as described in claim 6 wherein in step (c) forming said second end of said frame-assembly includes forming at least one sharply pointed barb on said second end.

9. A method of constructing a double-enveloped electric lamp as described in claim 6 wherein in step (a) forming said neck of said outer envelope includes forming thread in said neck; wherein in step (d) forming said base includes forming a matching thread in said base; and wherein in step (g) mounting said base includes screwing said base onto said neck.

10. A method of constructing a double-enveloped electric lamp as described in claim 6 wherein in step (b) forming an inner envelope includes forming a tungston-halogen light-source capsule.

* * * * *